April 6, 1937.                J. W. CHANNELL                 2,076,223
                        APPARATUS FOR SPLICING CABLE
                  Original Filed April 24, 1934    2 Sheets-Sheet 1
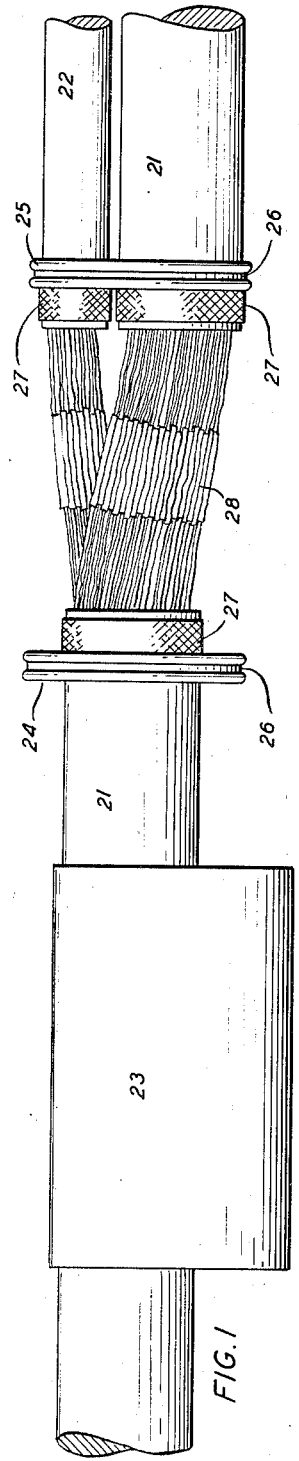
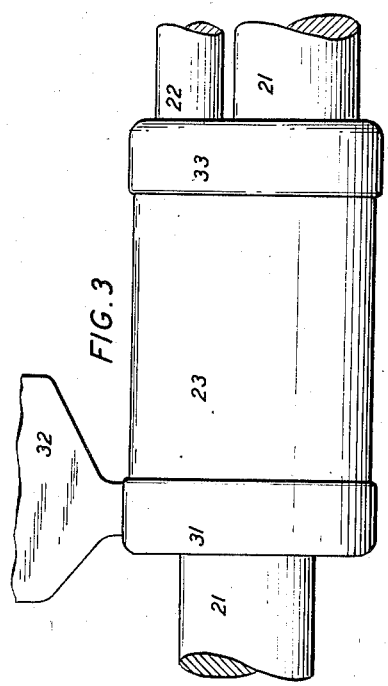
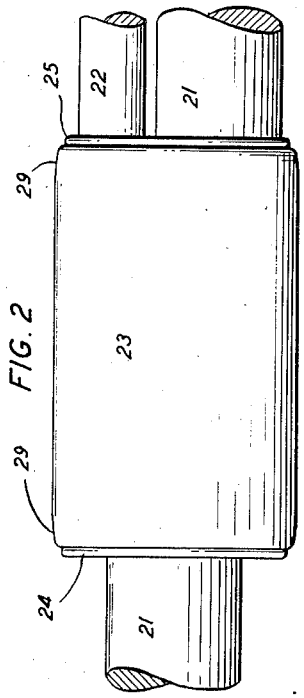
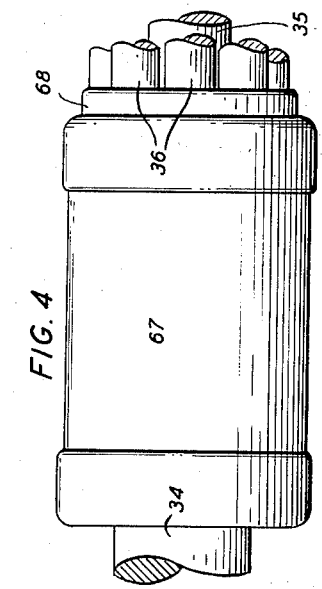
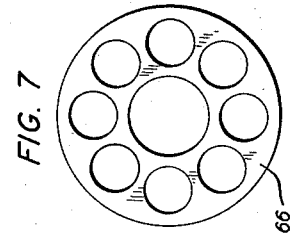
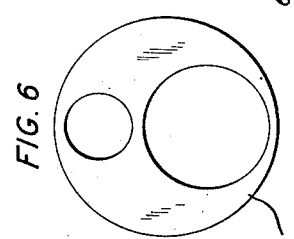
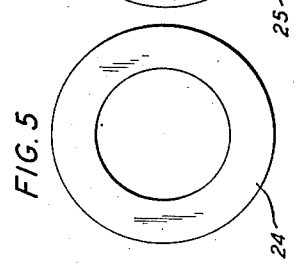
INVENTOR
J. W. CHANNELL
BY J. MacDonald
ATTORNEY April 6, 1937. J. W. CHANNELL 2,076,223
APPARATUS FOR SPLICING CABLE
Original Filed April 24, 1934 2 Sheets-Sheet 2
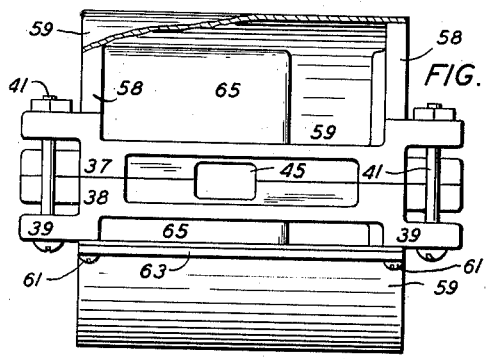
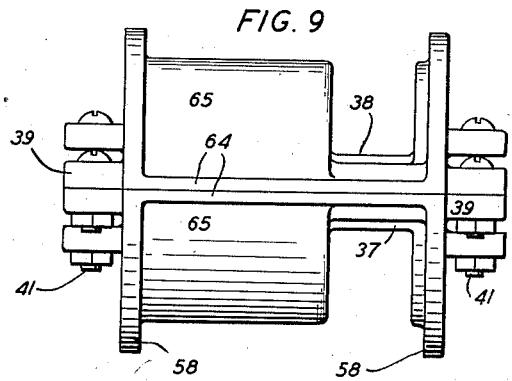
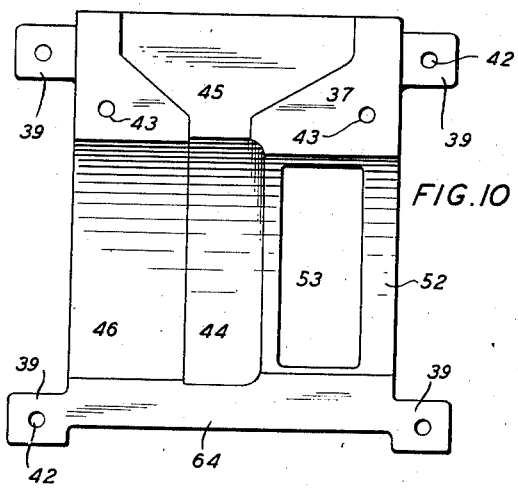
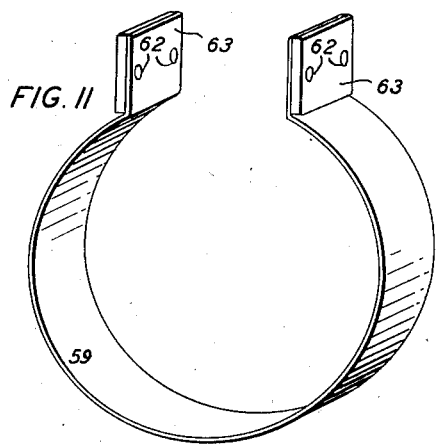
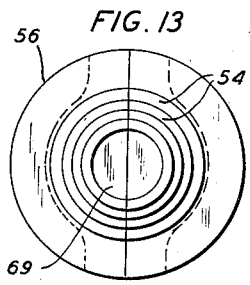
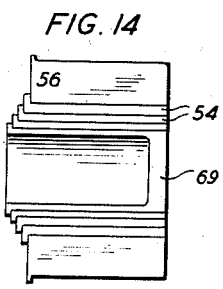
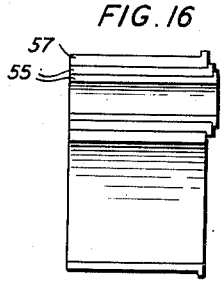
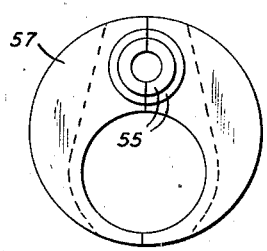
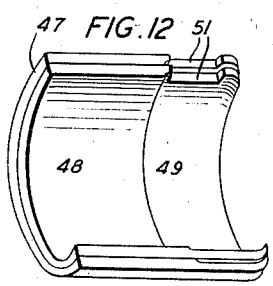
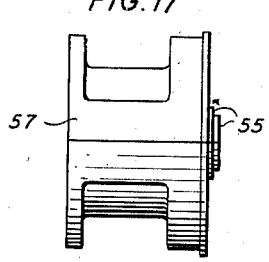
INVENTOR
J. W. CHANNELL
BY J. MacDonald
ATTORNEY Patented Apr. 6, 1937

2,076,223

UNITED STATES PATENT OFFICE 2,076,223

APPARATUS FOR SPLICING CABLE

James W. Channell, Southgate, Calif.

Original application April 24, 1934, Serial No. 722,064. Divided and this application December 26, 1935, Serial No. 56,201

3 Claims. (Cl. 22—116)

This invention relates to molds for use in making cable splices and more particularly to molds for use in splicing lead covered cables, and the present application is a division of my original application Serial No. 722,064 filed April 24, 1934.

Its object is to provide a mold which is simple and inexpensive to make, which will present minimum hazard to workmen in connection with its use, and which will produce a more efficient joint in less time and with less fusible material than that required by the so-called "wiping" method.

A further object is to provide a mold which will make satisfactory joints that would be extremely difficult or impossible to make by hitherto known means, such, for example, as multiple Y connections in lead-covered cable, where there are a large number of closely grouped branches.

In accordance with this invention, I provide a mold consisting of two parts in easily separable sections adapted to engage the cable ends, to be spliced and for holding them in proper relation to each other in the mold, said mold affording a casting cavity completely surrounding the cable ends, and having an outer chamber wherein molten material may be poured for preheating the casting cavity and the parts to be joined.

Referring to the drawings:

Figure 1 shows the first steps to be taken in making a Y splice of a lead-covered telephone cable;

Figure 2 illustrates the second step required in the making of such a splice;

Figure 3 illustrates the left-hand end of the joint nearly completed, and the right-hand end wholly completed;

Figure 4 is a side elevation of a completed multiple Y splice that has been produced in accordance with this invention, there being eight very closely grouped branches leading out of, and surrounding, a trunk line cable;

Figures 5, 6, and 7, respectively, are face views of three different forms of lead disks that are required to produce the joints illustrated in Figs. 3 and 4;

Figure 8 is a plan view of a special molding device that I employ for making poured joints of the kind shown in Figs. 3 and 4, a portion of the outer shell of the mold being shown broken away for the purpose of better illustrating the underlying structure;

Figure 9 is a bottom view of the mold shown in Figure 8, after the outer shell has been removed therefrom;

Figure 10 is a side elevation of half of the inner member of the above described mold, i. e. half of the structure shown in Fig. 9, when looking toward the diametral plane upon which said structure is split;

Figure 11 is a perspective view of the outer shell of the mold, after it has been removed from the assembled structure;

Figure 12 is a perspective view of two nested half liners that may be used in cooperation with the above described mold, to adapt it for making splices that require smaller sleeves than can be handled by the mold alone;

Figure 13 is an end elevation of a group of nested cable bushings, and the housing therefor, that may be used for centering and joining a coaxial cable in a cable splice, all of said parts being split on a diametral plane;

Figure 14 is a side elevation of the grouped elements shown in Fig. 13, looking toward the diametral plane upon which they are split;

Figure 15 is an end elevation of a housing suitable for cooperating with the mold, for making the branch end of a single Y splice, and showing nested bushings adapted for the accommodation of cables of different sizes, all of said parts being split on a diametral plane;

Figure 16 is a side elevation of one-half of the grouped elements shown in Figure 15, looking toward said diametral plane; and Figure 17 is a top elevation of the group of elements shown in Fig. 15.

Similar reference numerals refer to similar parts throughout the several views.

In the splicing of lead-covered electrical cables, it is essential to have perfectly amalgamated and non-porous joints, of considerable mechanical strength. Such work frequently has to be done in underground manholes, or in other places where space is limited and very valuable. For this reason, the physical dimensions of the splices is a matter of importance; but, nevertheless, wiped joints have been almost universally used for this purpose hitherto, as being the most practical known method of splicing. It often is desirable to splice a large number of closely grouped branch cables to a trunk cable at a single point, but hitherto this has not been feasible, by reason of the physical limitations inherent in wiped joints. Therefore, because of these limitations, it has been necessary hitherto to make more splices than would have been required if means for making closely grouped multiple Y branches had been known. My invention greatly extends the number of permissible branches that may be made at a given point, and greatly reduces the space requirements for all kinds of splices of this nature.

Considering the application of my invention to the splicing of lead-covered cables, it is to be noted; first, that it substitutes a "poured" or "cast" joint for the usual hand-formed "wiped" joint; second, that it provides a most convenient means for pre-heating the parts to be joined, to assure proper "tinning" thereof and to obviate premature freezing of the metal being cast; third, that it allows the poured joint to be cooled gradually and uniformly, to guard against shrinkage stresses and cracks; and, fourth, that, as a result of the just stated advantages, it permits of greatly varying the proportions of the alloy that is used for joining. In splicing lead-covered cables in accordance with my invention, lead-tin solder of greatly varying proportions may be used. Even pure tin may be employed for the purpose, if it is desired to do so. Contrasted with this, the physical characteristics of solder that is used for wiping limit its tin content to around 40%.

In the use of fusible alloys for such purposes as we are now considering, it is desirable, for obvious practical reasons, to have a rather wide difference between the melting temperature of the joining alloy and that of the parts to be joined. The greater this temperature difference, the less danger there is of fusing and spoiling such parts. Lead-tin solder is a very satisfactory alloy for work of this kind, and it is almost universally employed. The eutectic of such solder always is of the same composition, acts like a pure metal in freezing, and melts at around 358° F. The melting temperature of lead cable sheaths is around 621° F., and the difference between these two melting temperatures (263° F.) is ample for practical purposes. A pure eutectic of lead and tin doubtless would have been used almost exclusively hitherto, if it could have been wiped, but this is not possible. The pure eutectic does not pass through any pasty stage in cooling, and changes almost instantly from a wholly liquid to a wholly solid stage. Pure tin has a melting temperature of about 450° F. which is sufficiently below the melting temperature of lead cable sheaths to allow of its being used for splicing purposes, and it would be a very satisfactory material to employ therefor if it could be wiped, but, again, this is not the case. It passes through no pasty stage in cooling.

For practical purposes, since wiped joints for lead-covered cables have been the only satisfactory splicing means hitherto known, wiping solder that contains an excess of lead, over what is necessary for forming the eutectic, has been almost universally employed. The excess lead supplies the necessary quality of plasticity for wiping, but it also reduces the working temperature range and has certain other objections. Thus, if too much lead is employed in the solder, the joint is apt to be porous, there is more likelihood of imperfect tinning of the parts to be joined, and more danger of melting the cable sheath during the formation of the joint.

The difference in temperature between the melting point of the solder, and that of the lead cable sheaths, has not been sufficient to permit of making poured or molded joints in the field by hitherto known methods; because, if the fused metal is hot enough to be certain of filling the mold before it freezes, there is great danger of melting and destroying the lead sheaths that are to be joined. Pre-heating the sheaths, to overcome this difficulty, also has been exceedingly dangerous. Therefore, although poured joints may have been possible in the shop, their use in the field has been precluded for the practical reasons indicated.

It is to be remarked that molten lead-tin alloys oxidize quite readily, and the resulting dross must be kept out of the joint. On this account it would be desirable to use a higher percentage of tin in the solder, or even a solder of pure tin, if it were not for the lesser difference between the melting points of the fused metal and that of the lead parts to be joined. My invention, as indicated above, permits of the use of any ordinary alloy of lead and tin, and even of the use of tin alone; and it is easy to keep dross out of the joint when the method is employed.

Passing now to a detailed description of my invention, I have illustrated in Figs. 1–3 the method of using it for making a poured Y joint, as between a trunk line cable 21 and a branch cable 22, both of which are lead-covered. The first steps are setting up the cables in the desired positions, marking the location of the joint, opening up the cables, and cleaning the respective cable sheaths at the points where the splice is to be made. A lead splice sleeve 23 of suitable length, and that has been rounded to the correct size, as by having a mandrel passed therethrough, is slipped over one of the cables, as indicated in Fig. 1. This sleeve is to constitute the body portion of the finished splice.

The next step includes placing suitable preformed lead disks over the cables, at each end of the splice, and soldering the disks to the respective cable sheaths at the proper positions. Thus, a lead disk 24 is placed upon and soldered to the sheath of trunk line cable 21; and a lead disk 25 is placed upon and soldered to sheaths 21 and 22 at the right-hand end of the splice. The faces of these two disks are shown in Figs. 5 and 6 respectively. Both disks have grooved peripheries as indicated at 26; and, preferably, they are made of the same material as the cable sheaths. They easily may be pre-cast in suitable molds.

After disks 24 and 25 are properly positioned as described, a layer or two of friction tape is wrapped around the respective cable sheaths, immediately adjacent the inner faces of the disks, as shown at 27. This is to prevent fused metal from running into the splice when the joint is being poured.

The electrical connections of the conducting wires of the cables having been completed, as indicated at 28, a couple of layers of dry muslin are wrapped around the periphery of each disk; and splice sleeve 23 then is carefully slid into place over the disk peripheries, without disturbing the muslin. The respective ends of splice sleeve are then beaten into grooves 26 of the disks, against the muslin, as indicated at 29 in Fig. 2. In this way, a sufficiently tight joint can be made at the ends of the splice sleeve to prevent fused metal from running into the joint. A considerable element of mechanical strength is added to the construction in this way, and the sleeve is not likely to become displaced during the subsequent operations.

After completing the above described steps, so that the unfinished splice appears as shown in Fig. 2, the outer surfaces of the two disks, of the cable sheaths adjacent thereto, and the contiguous ends of the splice sleeve, are cleaned, and made ready for completing the joint by pouring.

Each end of the splice is poured separately, and for that purpose I have devised a particular type of mold which will be described below. This mold is put over the end of the splice in proper position, and fused joining metal is poured thereinto; so as to completely cover and amalgamate with the respective end of splice sleeve 23, the outer surface of the respective lead disk, and the adjacent sheaths of the cables. After pouring and cooling, the mold is removed, and the poured end of the splice will then appear as at the left-hand end of Fig. 3. The joint now is, in effect, a coalescing cap or ferrule 31 over the left-hand end of sleeve 23; the "gate" 32, which has resulted from the pouring, still being integral therewith. This gate is next sawed off with a hack-saw, and the surface of the cap at this point is filed down, so that the joint will appear as shown at 33, at the right-hand end of the splice illustrated in Fig. 3. The latter represents a completed joint.

If the work has been done carefully in the manner described, the poured metal will amalgamate perfectly with the respective cable sheaths and splice sleeve 23; and form what is, for all practical purposes, a perfect joint. It will be noted that the overall length, as well as the overall diameter, of the completed splice is much less than the usual corresponding dimensions of wiped joints; and that the splice also is much neater in appearance. Still further, there is no likelihood of porosity being present, or of there being any cracks that are due to imperfectly amalgamated material. The possibility of such imperfections is always present in wiped joints.

Fig. 4 illustrates how my invention may be utilized for producing a multiple Y splice, in which there are eight very closely grouped branches surrounding a central trunk line. The particular splice illustrated comprises; a main trunk line cable 34, a continuing trunk line cable 35 of somewhat smaller diameter, and eight branch cables 36. It would be almost impossible to make a satisfactory splice of this kind by wiping, on account of the extreme difficulty of effecting satisfactory joints back of the outer eight branch cables. By my method, however, it is easy to produce such a splice, by slightly modifying the above described process in a manner that will be explained in detail below.

Referring now to the mold of my invention, reference will be had to Figs. 8–17 inclusive. The mold is a double-walled device, made in such a manner that it can be slipped over, or off from, the splice at will. It comprises an inner chamber that constitutes a perfect mold for the desired poured joints, and an outer chamber in which fused metal may be poured and retained to assure of proper pre-heating of parts, and slow after-cooling thereof. The mold proper is split on a diametral plane, and a number of interchangeable diametrically split bushings are provided, so that the combined appliances may be used interchangeably for producing splices on various sizes, and for different arrangements, of cables.

The body portion of my mold is shown in Figs. 8, 9, and 10; in plan, bottom view, and side elevation of one-half, respectively. This main body portion is split on a diametral plane, so as to form matched halves. In the position shown in Figs. 8–10, the mold is adapted for forming the right-hand end of a splice. For forming the left-hand end of the splice, the mold is reversed, end for end. In the position indicated in Figs. 8–10, the rear element of the main body of the mold is indicated at 37, and the front element at 38. These two body portions are provided with cooperating pairs of longitudinal extending lugs 39 at the respective ends, and the body portions may be conveniently assembled, by means of stove-bolts 41 passing through bolt holes 42 in these lugs. The two halves of the mold body may be assembled with the aid of dowel pins, as indicated at 43, to assure of their being accurately positioned for cooperation.

Referring to Fig. 10, the cavity of the mold in which the casting of the finished joint actually takes place, is shown at 44, and a gate passage 45 leads thereinto at the top. A co-axial bore 46, leading from this mold cavity, is of a diameter that will closely fit the largest size of splice sleeve that is to be employed. For use with smaller splice sleeves, I provide a set of diametrically split liners, of which two are shown in Fig. 12. The outer diameter of the largest of these liners, i. e. that shown at 47, accurately fits bore 46. The outer diameter of liner 48 accurately fits the inner bore of liner 47, and the inner diameters of both of these liners fit the sleeves of the splice intended to be made thereby. Each of the liners just described has a mold cavity 49 therein, corresponding to cavity 44 of the main body of the device, and gate passages 51 lead into these cavities from gate passage 45.

At the other, or right-hand, side of mold cavity 44 is a somewhat similar co-axial bore 52, intended for positioning the cables that are to be joined. This bore has a large orifice 53 leading from each of its sides, for a purpose that will be described later. For positioning the cables to be joined, I provide various sets of nested and diametrically split bushings, of which half sets are shown in elevation at 54 and 55 in Figs. 14 and 16; these bushings being illustrated in end elevation in Figs. 13 and 15 respectively. The set of bushings illustrated in Figs. 13 and 14 are intended for positioning single concentric cables. The devices illustrated in Figs. 15 and 16 may be used for positioning two cables, one above the other. The outer diameter of housings 56 and 57 that cooperate with these respective sets of cable bushings, accurately fits bore 52.

After setting up the cables to be joined, and adjusting the splice sleeve in the position shown in Fig. 2, the joint is ready for pouring. The proper selection of the devices shown in Figs. 13–17 is then made, and these are applied to the cables adjacent the end of the splice that is to be poured first. The mold body is next applied and clamped in position for pouring the joint, by means of stove-bolts 41. This body is provided with a circular flange 58 at each end, and an outer sheet metal shell 59 is sprung over these flanges, and drawn up tightly in place therearound, by means of screws 61 passing through holes 62 in the end-plates 63 of the outer shell. Before the joint proper is poured, molten metal, which may be the same metal as that used for joining, is poured into the two cavities formed by outer shell 59 and longitudinal flanges 64, the latter being at the bottom of the main body portions of the mold, and integral therewith. The purpose of these flanges is to keep separate the metal cast in the outer chambers of the mold, so that both the mold and this metal may be easily removed when it has served its purpose, i. e., to pre-heat the adjacent parts previous to pouring the splice joint; and for the further purpose of preventing too rapid cooling of the poured joint, and any shrinkage stress or cracks that might result therefrom. It will be observed, that the metal used for pre-heating will come in actual contact with body portion 65, which surrounds mold cavity 44, and bore 46 which engages the splice sleeve. The pre-heating metal also comes in contact, through orifices 53, with the outer surfaces of housings 56 and 57, which engage the cable ends. In this manner all of the parts to be joined may be thoroughly pre-heated before the splice joint is poured.

After proper pre-heating in the manner described, the joint is poured through gate passage 45. When this metal has become set and sufficiently cooled, the mold and all its parts, as well as the castings of the pre-heating metal, are removed from the splice. Casting gate 32 is then sawed off, and the cast ferrule 31 is filed up to complete the joint. If the work has been properly accomplished, the joint casting will be thoroughly amalgamated to, and substantially integral with, the parts to which it has been applied. The above described operations are then repeated at the other end of the splice, after the mold has been reversed end for end.

A slight modification of the above described steps is necessary for producing such a multiple Y splice as is shown in Fig. 4. On account of the large number of cables that it is possible to join in such a splice, it is impractical to provide separable bushings and housings, that may be stripped and removed from the splice after the joint is cast. In fact, the use of any such bushings would require more space between the branches of the multiple Y than is necessary, when the method now to be described is employed. Therefore, in place of using such cable bushings and housings as are indicated in Figs. 13–17, I employ two lead disks of the kind shown at 66 in Fig. 7. Practically any desired arrangement of Y branches may be secured in a splice formed by the use of such disks. One of the disks is used in precisely the same manner as disk 25 shown in Fig. 1, and splice sleeve 67 (see Fig. 4) is beaten into the periphery of this disk in the same manner as shown in Fig. 2. The other, and outer, of these special disks, shown at 68 in Fig. 4, is spaced outside of, and at a slight distance from disk 66. In order to form this special splice, orifices 53 of the mold obviously must be blocked off; and, for this purpose, I use a relatively thin length of tubing corresponding to the length of bore 52 of the mold, and split the same on a diametral plane. Special disk 68 is made so that its outer diameter fits the bore of this tubular sleeve. The molten metal for the splice joint flows into the space between the two disks, and amalgamates with each. During the pouring, the outer disk 68 may be held in place in any suitable manner, as by wedging or by the use of friction tape, and the procedure to be followed will be apparent to any skilled person, in view of what has been said.

Procedure that is similar to that described, may be employed when a dead-end, or head, is to be placed upon the extremity of a cable. In this case suitable bushings, of the kind shown in Fig. 13, may be employed for positioning the cable; and a similar set of bushings and a housing, arranged as in Fig. 14, may be used for forming the dead-end. In the latter case the bore of the innermost bushing is filled by a hollow plug 69. However, in place of the last mentioned bushings and housing, a plain imperforate lead disk may be employed, in a manner that will be apparent from what has preceded.

Obviously, apparatus may be utilized for splicing lead-covered power cables; or for splicing cables sheathed with material other than lead, where it is practical to use a metal of relatively low melting point that will amalgamate with the sheath. Furthermore, it will be seen that, with slight modifications that will occur to those familiar with such arts, my apparatus may be utilized for joining other things than cables, such as lead plumbing pipes and lead fixtures.

It is to be noted that the material of the mold, and that of its cooperating parts, must be such that the molten casting metal cannot adhere thereto. Also that the mold and its cooperating parts should be so formed, as by a liberal use of "drag", that these parts may be easily removed from the cast metal. It has not been thought to be necessary to illustrate such "drag", since this is a well known expedient.

If the same material, such as lead-tin solder, is used for pouring the splice joint and for pre-heating the mold and its cooperating parts, there need be no waste of this material by reason of its use for pre-heating. The castings made in the outer chamber of the mold may be put back into the melting pot, and be re-melted for subsequent use.

It will be seen, that, since the metal to be used for joining must have a lower melting point than that of the metal of the parts to be joined, there can be no danger of melting the parts to be joined, and no danger that the mold proper will not be completely filled by reason of too rapid cooling after pouring.

The methods to be used for making splices other than those shown and described, will be readily apparent to those familiar with the splicing art. Such other splices as are within the scope of my process, really are modifications of, or combinations of, those that have been described.

What is claimed is:

1. A mold for making joints in metallic sheathed cable comprising a pair of members secured together at their ends, a central bore formed by said members and extending the entire length of said mold, an orifice extending through the wall of said bore for the introduction of molten material, a band of flexible material surrounding the outer wall of said bore and spaced therefrom by flanges thereon to provide a chamber therebetween, said chamber extending the entire length of said bore, and an opening in said outer chamber for the admittance of a second molten material.

2. A mold for making joints in metallic sheathed cable comprising a pair of members secured together at their ends, a central bore of different diameters formed by said members and extending the entire length of said mold, an orifice extending through the wall of said bore for the introduction of molten material, a band of flexible material surrounding the outer wall of said bore and spaced therefrom by flanges thereon to provide a chamber therebetween, said chamber extending the entire length of said bore, and an opening in said outer chamber for the admittance of a second molten material.

3. A mold for making joints in metallic sheathed cable comprising a pair of members secured together at their ends, a central bore of different diameters formed by said members and extending the entire length of said mold, an orifice extending through the wall of said bore for the introduction of molten material, a band of flexible material surrounding the wall of said bore and spaced therefrom by flanges thereon to provide a chamber therebetween, said chamber extending the entire length of said bore, an opening in said outer chamber for the admittance of molten material, and split bushings or liners of various shapes and sizes arranged to be fitted into one end of said bore to accommodate various cable arrangements.

JAMES W. CHANNELL.